United States Patent
Shimizu et al.

(10) Patent No.: US 7,043,627 B2
(45) Date of Patent: May 9, 2006

(54) SIMD OPERATION SYSTEM CAPABLE OF DESIGNATING PLURAL REGISTERS VIA ONE REGISTER DESIGNATING FIELD

(75) Inventors: Takehiro Shimizu, Kokubunji (JP); Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 533 days.

(21) Appl. No.: 09/944,409

(22) Filed: Sep. 4, 2001

(65) Prior Publication Data

US 2002/0026570 A1 Feb. 28, 2002

(30) Foreign Application Priority Data

Nov. 8, 2000 (JP) ............................. 2000-340239

(51) Int. Cl.
*G06F 15/00* (2006.01)
(52) U.S. Cl. ..................... 712/225; 712/22; 712/210; 712/2
(58) Field of Classification Search ................ 712/2, 712/22, 208, 210, 213, 225
See application file for complete search history.

(56) References Cited

U.S. PATENT DOCUMENTS

| 5,390,307 A | * | 2/1995 | Yoshida ..................... 712/225 |
| 6,038,582 A | | 3/2000 | Arakawa et al. |
| 6,463,525 B1 | * | 10/2002 | Prabhu ....................... 712/222 |

FOREIGN PATENT DOCUMENTS

| JP | 03-260727 | 3/1990 |
| JP | 07-200542 | 12/1993 |
| JP | 07-152535 | 8/1994 |
| JP | 10-124484 | 10/1996 |
| WO | WO 96/17291 | 12/1995 |

OTHER PUBLICATIONS

Intel Corporation, IA-64 Application Developer's Architecture Guide, May 1999, pp. 6-1 to 7-189.*
Intel Corporation, IA-64 Application Developer's Architecture Guide, May 1999, p. C-17.*

* cited by examiner

*Primary Examiner*—Dov Popovici
*Assistant Examiner*—Tonia L. Meonske
(74) *Attorney, Agent, or Firm*—Reed Smith LLP; Stanley P. Fisher, Esq.; Juan Carlos A. Marquez, Esq.

(57) ABSTRACT

In view of a necessity of alleviating factors obstructing an effect of SIMD operation such as in-register data alignment in high speed formation of an SIMD processor, numerous data can be supplied to a data alignment operation pipe 211 by dividing a register file into four banks and enabling to designate a plurality of registers by a single piece of operand to thereby enable to make access to four registers simultaneously and data alignment operation can be carried out at high speed. Further, by defining new data pack instruction, data unpack instruction and data permutation instruction, data supplied in a large number can be aligned efficiently. Further, by the above-described characteristic, definition of multiply accumulate operation instruction maximizing parallelism of SIMD can be carried out.

4 Claims, 20 Drawing Sheets

FIG. 4

| a | b | c | d | e | f | R0 | R1 | R2 | R3 | R4 | R5 | R6 | R7 | R8 | | R59 | R60 | R61 | R62 | R63 |
|---|---|---|---|---|---|----|----|----|----|----|----|----|----|----|---|-----|-----|-----|-----|-----|
| 0 | 0 | 0 | 0 | 0 | 0 | 1 | 1 | 1 | 1 | 0 | 0 | 0 | 0 | 0 | | 0 | 0 | 0 | 0 | 0 |
| 0 | 0 | 0 | 0 | 0 | 1 | 0 | 1 | 1 | 1 | 1 | 0 | 0 | 0 | 0 | | 0 | 0 | 0 | 0 | 0 |
| 0 | 0 | 0 | 0 | 1 | 0 | 0 | 0 | 1 | 1 | 1 | 1 | 0 | 0 | 0 | | 0 | 0 | 0 | 0 | 0 |
| 0 | 0 | 0 | 0 | 1 | 1 | 0 | 0 | 0 | 1 | 1 | 1 | 1 | 0 | 0 | ……… | 0 | 0 | 0 | 0 | 0 |
| 0 | 0 | 0 | 1 | 0 | 0 | 0 | 0 | 0 | 0 | 1 | 1 | 1 | 1 | 0 | | 0 | 0 | 0 | 0 | 0 |
| 0 | 0 | 0 | 1 | 0 | 1 | 0 | 0 | 0 | 0 | 0 | 1 | 1 | 1 | 1 | | 0 | 0 | 0 | 0 | 0 |
| 0 | 0 | 0 | 1 | 1 | 0 | 0 | 0 | 0 | 0 | 0 | 0 | 1 | 1 | 1 | | 0 | 0 | 0 | 0 | 0 |
| ⋮ | | | | | | ⋮ | | | | | | | | | | ⋮ | | | | |
| 1 | 1 | 1 | 0 | 1 | 1 | 0 | 0 | 0 | 0 | 0 | 0 | 0 | 0 | 0 | | 1 | 1 | 1 | 1 | 0 |
| 1 | 1 | 1 | 1 | 0 | 0 | 0 | 0 | 0 | 0 | 0 | 0 | 0 | 0 | 0 | | 0 | 1 | 1 | 1 | 1 |
| 1 | 1 | 1 | 1 | 0 | 1 | 0 | 0 | 0 | 0 | 0 | 0 | 0 | 0 | 0 | ……… | 0 | 0 | 1 | 1 | 1 |
| 1 | 1 | 1 | 1 | 1 | 0 | 0 | 0 | 0 | 0 | 0 | 0 | 0 | 0 | 0 | | 0 | 0 | 0 | 1 | 1 |
| 1 | 1 | 1 | 1 | 1 | 1 | 0 | 0 | 0 | 0 | 0 | 0 | 0 | 0 | 0 | | 0 | 0 | 0 | 0 | 1 |

FIG. 5

| a | b | To 206 | To 307 | | |
|---|---|--------|----|----|----|
| 0 | 0 | X0 | X1 | X2 | X3 |
| 0 | 1 | X1 | X2 | X3 | X0 |
| 1 | 0 | X2 | X3 | X0 | X1 |
| 1 | 1 | X3 | X0 | X1 | X2 |

FIG. 7

| a | b | input | | | output | | | |
|---|---|---|---|---|---|---|---|---|
| 0 | 0 | X | Y | Z | 0 | X | Y | Z |
| 0 | 1 | X | Y | Z | Z | 0 | X | Y |
| 1 | 0 | X | Y | Z | Y | Z | 0 | X |
| 1 | 1 | X | Y | Z | X | Y | Z | 0 |

FIG. 8

| a | b | X | output | | | |
|---|---|---|---|---|---|---|
| 0 | 0 | X | X | 0 | 0 | 0 |
| 0 | 1 | X | 0 | X | 0 | 0 |
| 1 | 0 | X | 0 | 0 | X | 0 |
| 1 | 1 | X | 0 | 0 | 0 | X |

FIG. 9

PACK.W Rm, Rn, Rd

| xxxxxx | m | xxxxx | n | d | 0000 |
|---|---|---|---|---|---|
| 31 26 | 25 20 | 19 16 | 15 10 | 9 4 | 3 0 | operation
```
source [1] ← SignExtend₆₄(Rm);
source [2] ← SignExtend₆₄(Rm+1);
source [3] ← SignExtend₆₄(Rm+2);
source [4] ← SignExtend₆₄(Rm+3);
amount ← ZeroExtend₆₄(Rn);
REPEAT i FROM 0 FOR 4
result [i] ← ZeroExtend₁₆(source[i]>>amount);
Rd ← MultiRegister₁₆(result);
```

FIG. 10

PACKI.W Rm, s, Rd

| xxxxxx | m | s | d | 0000 |
|---|---|---|---|---|
| 31 26 | 25 20 | 19 10 | 9 4 | 3 0 | operation
```
source [1] ← SignExtend₆₄(Rm);
source [2] ← SignExtend₆₄(Rm+1);
source [3] ← SignExtend₆₄(Rm+2);
source [4] ← SignExtend₆₄(Rm+3);
amount ← SignExtend₁₀(s);
REPEAT i FROM 0 FOR 4
result [i] ← ZeroExtend₁₆(source[i]>>amount);
Rd ← MultiRegister₁₆(result);
```

FIG. 12

UNPACK.W Rm, Rd

| xxxxxx | m | xxxxx | 000000 | d | 0000 |
|---|---|---|---|---|---|
| 31 | 26 25 | 20 19 | 16 15 | 10 9 | 4 3  0 | operation   source ← SignExtend$_{64}$(Rm);
REPEAT i FROM 0 FOR 4
result [i] ← SignExtend$_{64}$(SignExtend$_{16}$ (source[i]) );
Rd ← Register(result [0]);
Rd+1 ← Register(result [1]);
Rd+2 ← Register(result [2]);
Rd+3 ← Register(result [3]);

FIG. 13

UNPACK.B Rm, Rw, Rd

| xxxxxx | m | xxxxx | w | d | 0000 |
|---|---|---|---|---|---|
| 31 | 26 25 | 20 19 | 16 15 | 10 9 | 4 3  0 | operation   source ← SignExtend$_{64}$(Rm);
REPEAT i FROM 0 FOR 8
result [i] ← SignExtend$_{64}$(SignExtend$_{8}$ (source[i]) );
Rw ← Register(result [0]);
Rw+1 ← Register(result [1]);
Rw+2 ← Register(result [2]);
Rw+3 ← Register(result [3]);
Rd ← Register(result [4]);
Rd+1 ← Register(result [5]);
Rd+2 ← Register(result [6]);
Rd+3 ← Register(result [7]);

FIG. 15

MSHFLE.W Rm, Rn, Rd

| xxxxxx | m | xxxxx | n | d | 0000 |
|---|---|---|---|---|---|
| 31 26 | 25 20 | 19 16 | 15 10 | 9 4 | 3 0 | operation
```
source1 ← MultiZeroExtend₁₆(Rm);
source2 ← MultiZeroExtend₁₆(Rm+1);
source3 ← MultiZeroExtend₁₆(Rn);
source4 ← MultiZeroExtend₁₆(Rn+1);
REPEAT i FROM 0 FOR 2
{
result1[i x2]   ← source2[i+2]; result1[(i x2)+1] ← source1[i+2];
result2[i x2]   ← source2[i];   result2[(i x2)+1] ← source1[i];
result3[i x2]   ← source4[i+2]; result3[(i x2)+1] ← source3[i+2];
result4[i x2]   ← source4[i];   result4[(i x2)+1] ← source3[i];
}
Rd   ← MultiRegister₁₆(result1);
Rd+1 ← MultiRegister₁₆(result2);
Rd+2 ← MultiRegister₁₆(result3);
Rd+3 ← MultiRegister₁₆(result4);
```

FIG. 16

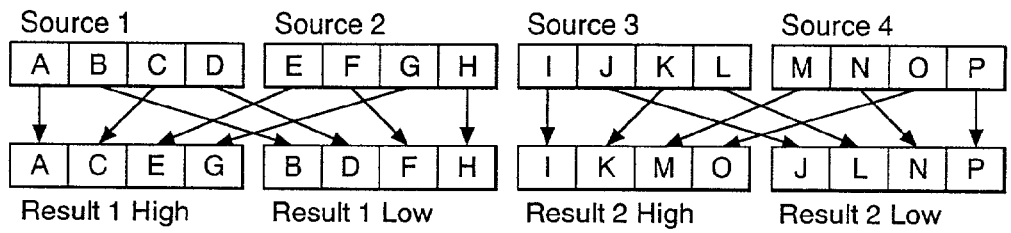

FIG. 18

MSHFHI.W Rm, Rn, Rd

| xxxxxx | m | xxxxx | n | d | 0000 |
|---|---|---|---|---|---|
| 31   26 | 25   20 | 19   16 | 15   10 | 9   4 | 3   0 | operation  source1 ← MultiZeroExtend$_{16}$(Rm);
source2 ← MultiZeroExtend$_{16}$(Rm+1);
source3 ← MultiZeroExtend$_{16}$(Rm+2);
source4 ← MultiZeroExtend$_{16}$(Rm+3);
source5 ← MultiZeroExtend$_{16}$(Rn);
source6 ← MultiZeroExtend$_{16}$(Rn+1);
source7 ← MultiZeroExtend$_{16}$(Rn+2);
source8 ← MultiZeroExtend$_{16}$(Rn+3);
REPEAT i FROM 0 FOR 2
{
result1[i x2] ← source2[i+2]; result1[(i x2)+1] ← source1[i+2];
result2[i x2] ← source4[i+2]; result2[(i x2)+1] ← source3[i+2];
result3[i x2] ← source6[i+2]; result3[(i x2)+1] ← source5[i+2];
result4[i x2] ← source8[i+2]; result4[(i x2)+1] ← source7[i+2];
}
Rd ← MultiRegister$_{16}$(result1);
Rd+1 ← MultiRegister$_{16}$(result2);
Rd+2 ← MultiRegister$_{16}$(result3);
Rd+3 ← MultiRegister$_{16}$(result4);

FIG. 19

MSHFLO.W Rm, Rn, Rd

| xxxxxx | m | xxxxx | n | d | 0000 |
|---|---|---|---|---|---|
| 31  26 | 25  20 | 19  16 | 15  10 | 9  4 | 3  0 | operation
    source1 ← MultiZeroExtend$_{16}$(Rm);
    source2 ← MultiZeroExtend$_{16}$(Rm+1);
    source3 ← MultiZeroExtend$_{16}$(Rm+2);
    source4 ← MultiZeroExtend$_{16}$(Rm+3);
    source5 ← MultiZeroExtend$_{16}$(Rn);
    source6 ← MultiZeroExtend$_{16}$(Rn+1);
    source7 ← MultiZeroExtend$_{16}$(Rn+2);
    source8 ← MultiZeroExtend$_{16}$(Rn+3);
    REPEAT i FROM 0 FOR 2
    {
      result1[i x2] ← source2[i]; result1[(i x2)+1] ← source1[i];
      result2[i x2] ← source4[i]; result2[(i x2)+1] ← source3[i];
      result3[i x2] ← source6[i]; result3[(i x2)+1] ← source5[i];
      result4[i x2] ← source8[i]; result4[(i x2)+1] ← source7[i];
    }
    Rd ← MultiRegister$_{16}$(result1);
    Rd+1 ← MultiRegister$_{16}$(result2);
    Rd+2 ← MultiRegister$_{16}$(result3);
    Rd+3 ← MultiRegister$_{16}$(result4);

FIG. 22

| MMAC.WQ Rm, Rn, Rw | xxxxxx | m | xxxxx | n | w | 0000 |
|---|---|---|---|---|---|---|
| | 31  26|25  20|19  16|15  10|9  4|3  0 | operation    source1 ← MultiSignExtend$_{16}$(Rm);
    source2 ← MultiSignExtend$_{16}$(Rm+1);
    result [0] ← SignExtend$_{64}$(Rn);
    result [1] ← SignExtend$_{64}$(Rn+1);
    result [2] ← SignExtend$_{64}$(Rn+2);
    result [3] ← SignExtend$_{64}$(Rn+3);
    REPEAT i FROM 0 FOR 4
    {
    temp ← source1[i] x source2[i];
    temp ← SignedSaturate$_{64}$(temp<<1)
    result [i] ← SignedSaturate$_{64}$(result [i] + temp)
    }
    Rw ← Register(result [0]);
    Rw+1 ← Register(result [1]);
    Rw+2 ← Register(result [2]);
    Rw+3 ← Register(result [3]);

FIG. 25A

| | |
|---|---|
| mulu.l | r51, r24, r51 |
| mulu.l | r52, r24, r52 |
| mulu.l | r53, r24, r54 |
| mulu.l | r54, r24, r54 |
| shlri | r51, 9, r51 |
| shlri | r52, 9, r52 |
| shlri | r53, 9, r53 |
| shlri | r54, 9, r54 |
| st.w | r17, 0, r51 |
| st.w | r17, 2, r52 |
| st.w | r17, 4, r53 |
| st.w | r17, 6, r54 |

FIG. 25B

| | |
|---|---|
| mulu.l | r51, r24, r51 |
| mulu.l | r52, r24, r52 |
| mulu.l | r53, r24, r54 |
| mulu.l | r54, r24, r54 |
| pack.w | r51, 9, r55 |
| st.q | r17, 0, r55 |

FIG. 26A

```
mshfhi.w    r17, r63, r20
mshflo.w    r17, r63, r17
mshfhi.l    r20, r63, r19
mshflo.l    r20, r63, r20
mshfhi.l    r17, r63, r21
mshflo.l    r17, r63, r17
```

FIG. 26B

```
unpack      r17, r17
```

FIG. 27A

```
mshfhi.w    r21, r6, r31
mshflo.w    r21, r6, r21
mshfhi.w    r31, r21, r41
mshflo.w    r31, r21, r42
mshfhi.w    r22, r7, r32
mshflo.w    r22, r7, r22
mshfhi.w    r32, r22, r43
mshflo.w    r32, r22, r44
```

FIG. 27B

```
mshfle.w    r21, r6, r41
```

SIMD OPERATION SYSTEM CAPABLE OF DESIGNATING PLURAL REGISTERS VIA ONE REGISTER DESIGNATING FIELD

BACKGROUND OF THE INVENTION

The present invention relates to a register designating system and an in-register data alignment processing in an SIMD (Single Instruction Multiple Data) processor, and relates to means for executing in-register data alignment without deteriorating a parallel processing function of SIMD at high speed.

Further, the present invention relates to means for operating standard multiply accumulate operation as a DSP (Digital Signal Processing) instruction while maintaining parallelism of SIMD without deteriorating accuracy.

Japanese Patent Laid-Open No. 124484 has disclosed a method of executing vector operation such that a plurality of consecutive registers can be designated by a single register designating field, when a vector operation processing, which is necessary in three-dimensional graphics or the like, is executed.

Further, as an in-resister data alignment instruction, various data alignment instructions, which can designate up to four operands, are described in "AltiVec Programming Interface Manual" of an instruction set Altivec for multimedia developed by Motorola Corporation.

Further, with regard to multiply accumulate operations, a multiply accumulate instruction, without deteriorating accuracy, is realized in the form of halving reduced parallelism of SIMD from 4 parallel to 2 parallel by an SH5 architecture developed jointly by Hitachi, Ltd. and ST Microelectronics.

According to the vector operation processing disclosed in Japanese Patent Laid-Open No. 124484, a constitution capable of designating only a multiple of 4 registers and therefore, which is devoid of freedom. Further, according to the data alignment instruction of Altivec, not only an operating apparatus is large-sized and expensive, but also only three source registers can be designated, and operation particular to SIMD such as data pack or unpack cannot be executed efficiently. Therefore, the parallelism of SIMD cannot fully be achieved.

SUMMARY OF THE INVENTION

It is a principal object of the invention to provide means with regard to data alignment for maximizing an effect of SIMD instruction.

Further, it is another object of the invention to provide a means for realizing a standard multiply accumulate operation instruction as a DSP instruction without deteriorating parallelism of SIMD and while maintaining accuracy thereof.

A simple explanation will be given of an outline of representative aspects of the invention disclosed in the application as follows.

According to an aspect of the invention, a processor includes an operation instruction comprising an instruction code and at least one register designating field, wherein the at least one register designating field designates a plurality of registers having consecutive numbers.

Further, according to another aspect of the invention, a processor comprises a decoder designating a plurality of read registers in one field in an arbitrary number of register designating fields; and a register file for outputting data in a plurality of registers having consecutive numbers in accordance with an output from the decoder.

Further, according to another aspect of the invention, a processor comprises a decoder for designating a plurality of write registers in one field in an arbitrary number of register designating fields; and a register file capable of writing values in a plurality of registers having consecutive numbers in accordance with an output from the decoder.

The register file includes a plurality of banks, and by reading or writing data from the plurality of banks, the number of ports of reading or writing the data of the respective banks is restricted to be equal to or smaller than the number of the register designating fields, to thereby restrain an increase in a circuit scale caused by reading or writing the data by a number of times larger than the number of the fields.

The number of the plurality of registers having the consecutive number is limited to the n-th power of 2 (n is a natural number), to thereby enable to reduce register selecting circuits.

Further, a data pack operation, which is capable of dealing with a number of the data read from the read registers larger than a number of the data written to the write registers in order to read data from the registers larger in a number than the number of the read register designating fields, is realized without producing invalid portions in the write registers.

Further, a data unpack operation, which is capable of dealing with a number of the data written to the write registers larger than a number of the data read from the read registers such that the data can be written to the registers larger in a number than the number of the write register designating fields, is realized in parallel without executing data writing a plurality of times.

Further, an operation of outputting the data having a data width wider than a width of input data such that the data can be written to the registers larger in a number than the number of the write register designating fields, is realized without producing an invalid portion in the input data and without mounting a special register having a wider data width.

Further, in order to supply the data respectively to pipes necessitating the data equal to or larger than the number of the register designative fields such as pipes for executing data alignment, a plurality of data buses are provided between registers and operation pipes in addition to a general purpose bus.

Further, a plurality of data buses are provided for writing data to registers between registers and operation pipes are provided for outputting a plurality of results such as a data unpack instruction, a permutation instruction, a matrix operational instruction, a multiply accumulate operation instruction and so on.

BRIEF DESCRIPTION OF THE DRAWINGS

FIG. 4 is a diagram showing a truth table of a logic circuit constituting a decode portion;

FIG. 5 is a diagram showing a truth table of a logic circuit constituting a selector for selecting data from banks of FIG. 3;

FIG. 7 is a diagram showing a truth table of a logic circuit constituting a selector for selecting a location of storing an operation result on a general purpose bus to a register of a bank;

FIG. 8 is a diagram showing a truth table of a logic circuit for constituting a selector for selecting a location of storing an operation result on a bus 210 to a register of a bank;

FIG. 9 is a diagram showing a definition of a data pack instruction;

FIG. 10 is a diagram showing a definition of a data pack instruction including an immediate value;

FIG. 12 is a diagram showing a definition of a data unpack instruction;

FIG. 13 is a diagram showing a definition of an unpack instruction with regard to 8 bit data;

FIG. 15 is a diagram showing a definition of a permutation instruction;

FIG. 16 is a specific explanatory diagram of a permutation instruction;

FIG. 18 is a diagram showing a definition of a permutation instruction;

FIG. 19 is a diagram showing other definition of a permutation instruction;

FIG. 22 is a diagram showing a definition of a multiply accumulate instruction;

FIGS. 25A and 25B are diagrams showing a program example indicating an effect of introducing a data pack instruction;

FIGS. 26A and 26B are diagrams showing a program example indicating an effect of introducing a data unpack instruction; and FIGS. 27A and 27B are diagrams showing a program example indicating an effect of introducing a permutation instruction.

DETAILED DESCRIPTION OF THE PREFERRED EMBODIMENTS

A detailed explanation will be given for the embodiments of the invention in reference to the drawings as follows. Further, in all of the drawings for explaining the embodiments, portions having the same functions are attached with the same notations, and repeated explanation thereof will be omitted.

Figure 1:
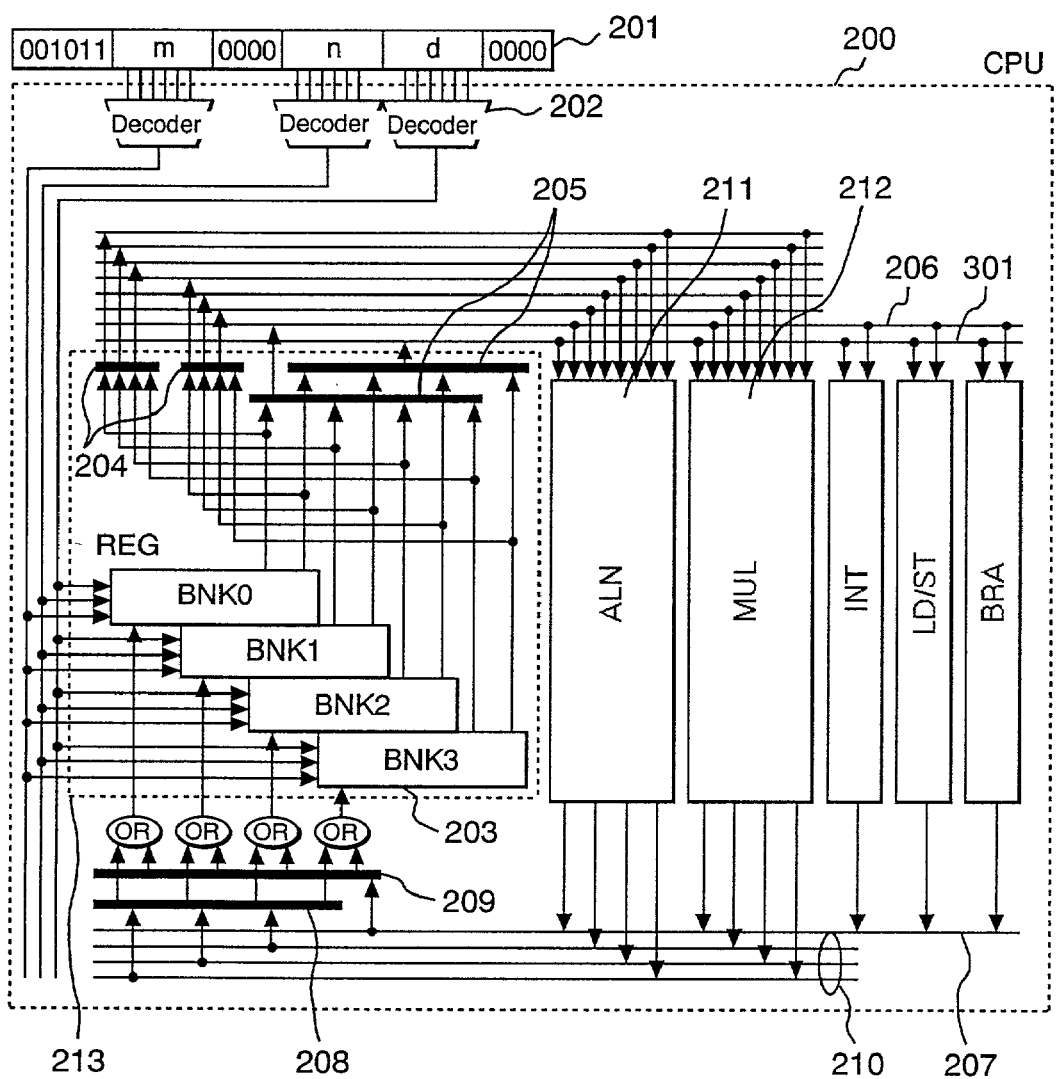
FIG. 1 is a block diagram of CPU (Central Processing Unit) of an SIMD processor according to an example of the invention.
Figure 2:
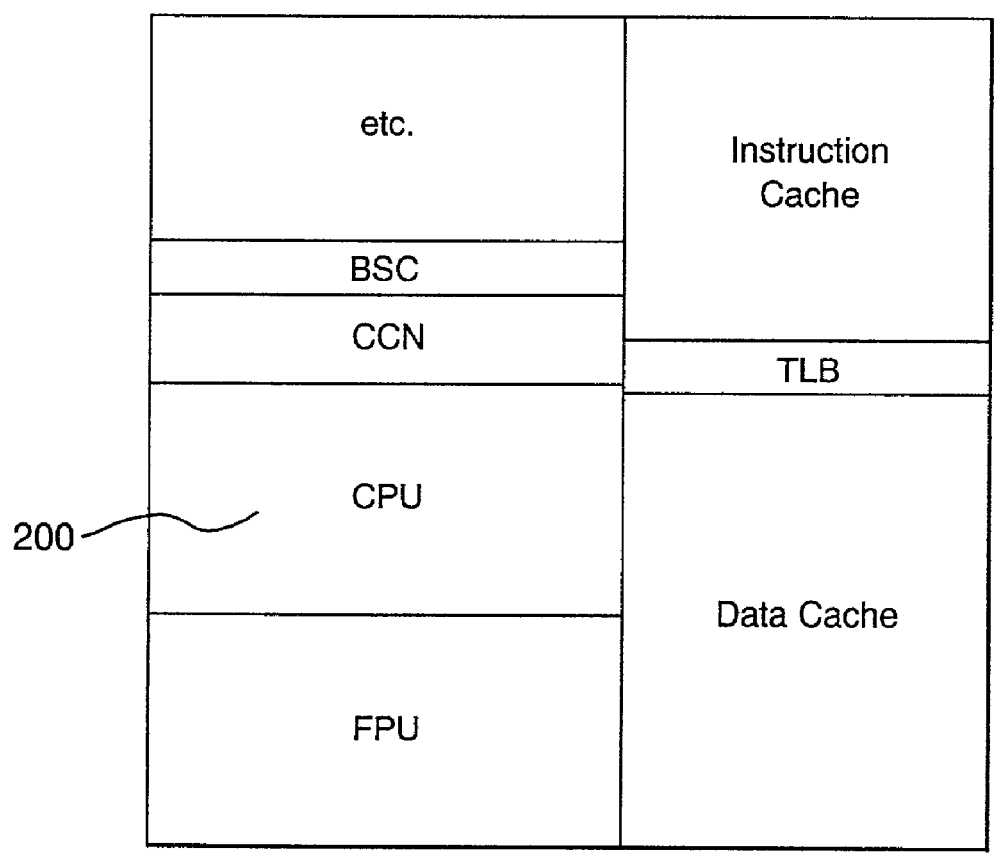
FIG. 2 is a block diagram of the SIMD processor according to the example of the invention.

FIG. 1 shows an outline of a block diagram of CPU of an SIMD processor according to an embodiment of the invention. Incidentally, the CPU block portion indicates a portion of CPU 200 in the layout of a microcomputer shown in FIG. 2. Further, in FIG. 2, a notation FPU designates a floating-point operation unit, a notation CCN designates a cache controller, a notation BSC designates a bus state controller, a notation TLB designates a translation look-aside buffer, and the layout thereof is constructed by a well-known constitution.

The SIMD processor shown in FIG. 1 adopts a 64 bit RISC (Reduced Instruction Set Computer) architecture as an example, and is provided with three operands for executing 32 bit fixed length instruction.

According to FIG. 1, an SIMD processor has the following five operation pipes: data alignment (ALN), multiply (MUL), integer operation (INT), load/store (LD/ST) and branch (BRA).

Figure 3:
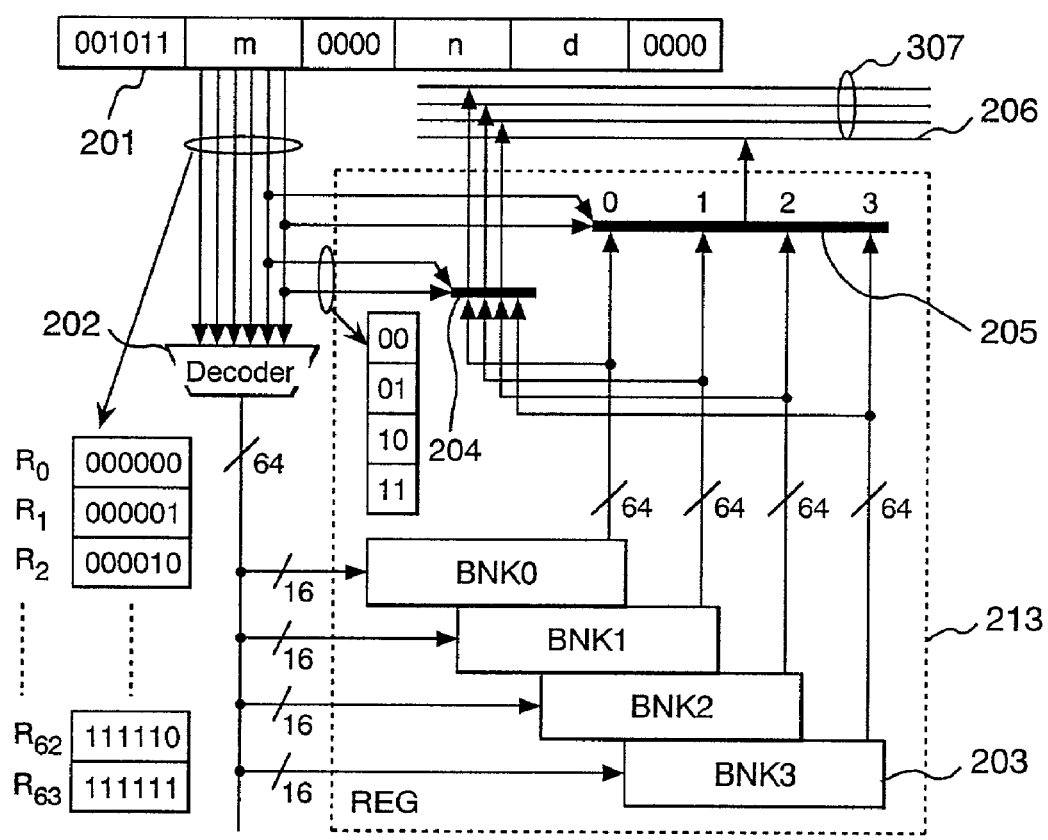
FIG. 3 is a detailed diagram of a vicinity of a register file portion of the SIMD processor.

FIG. 3 shows, in details, a portion of making access from an instruction decoder portion to a register file 213 in the block diagram of CPU of the SIMD processor as described above.

A register number of any of R0 through R63 is designated to a portion m, which is one of register designating fields of an instruction code 201, and the code is decoded by a decoder 202 to provide direct access to respective registers.

The decoder 202 is constituted by a logic circuit satisfying a truth table shown in FIG. 4. As is apparent also from FIG. 4, among 64 outputs, 4 pieces become high and 4 consecutive registers are designated at one time. Data read from a respective bank is outputted to a selector 204 and a selector 205. The selector 205 is supplied with lower 2 bits of the operand code m as a control signal for determining data to be outputted to a general purpose bus 206 for inputting.

Also the selector 204 is similarly supplied with data from respective banks. Lower 2 bits of the operand code m, that is the same as that of the selector 205, are used as a control signal for outputting remaining data excluding the data to be outputted to the general purpose bus.

FIG. 5 shows a truth table showing a behavior of outputs of the selectors 204 and 205. Notations a and b in the table signify the lower 2 bits of the operand code m as described above, output of the selector 205 corresponds to "To 206", and output of the selector 204 corresponds to "To 307". Further, notation "X" of X0 through X3 are expressed as output values of the "To 206" column, and the "To 307" column of the truth table represents BNK (that is, bank).

The outputs from the selectors 204 and 205 are exclusive to each other for a respective bank, and the selectors 204 and 205 are constituted by a logic circuit satisfying the truth table shown in FIG. 5.

Figure 6:
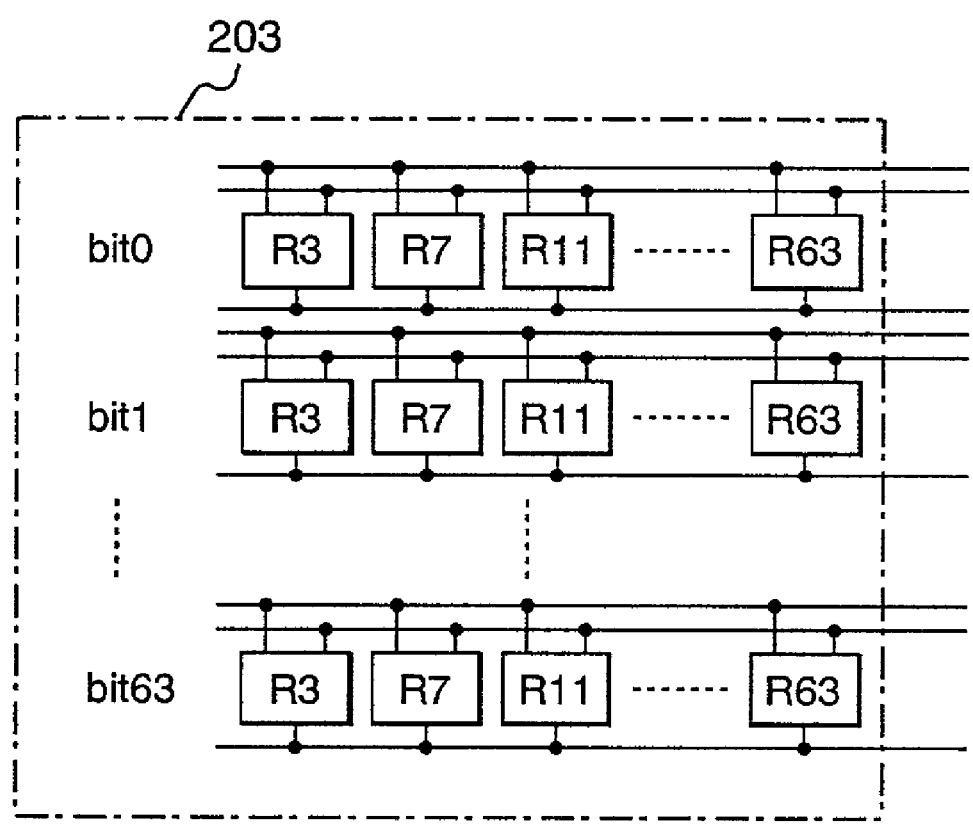
FIG. 6 is a detailed diagram of individual registers in a bank 203.

With regard to the respective bank, FIG. 6 shows a detailed diagram of the bank 3 (corresponding to 203 in FIG. 3), and respective registers present in the bank 3 (203) are constituted by standard registers (of 2 read•1 write for 1 bit in this example).

In FIG. 3, 16 registers of R0, R4, . . . , R4$n$ are stored in the bank 0, 16 pieces of R1, R5, . . . , R4$n$+1 are stored in the bank 1, 16 pieces of R2, R6, . . . , R4$n$+2 are stored in the bank 2, and 16 pieces of R3, R7, . . . , R4$n$+3 are stored in the bank 3.

As shown by FIG. 1, results of operations executed by respective operation pipes are outputted to a general purpose bus 207 for outputting. Further, according to the example, there are four outputs from data alignment position pipe and the multiply pipe and therefore. One of the four outputs is outputted to the general purpose bus 207 and the remaining three outputs are outputted to buses 210. Data on the buses 210 is inputted to a selector 208.

The selector 208 has 3 inputs and 4 outputs and is constituted by a logic circuit satisfying a truth table shown in FIG. 7.

Notations a and b in FIG. 7 designate control signals, notations X, Y and Z designate input values, and "output" designates outputs to the banks 0, 1, 2 and 3 from left.

A control signal inputted to the selector 208 uses lower 2 bits of a code indicated by a destination register designating field (operand code d). Further, data outputted to the general purpose bus 207 is inputted to a selector 209, and is selected and outputted to a bank with a register to be stored.

The selector 209 uses the lower 2 bits of the code (operand code d) indicated by the destination register designating field similarly to the selector 208, and is constituted by a logic circuit satisfying a truth table shown in FIG. 8.

Notations a and b in FIG. 8 designate values of the lower 2 bits of the destination register designating field (operand code d), a notation X designates an input value, and "output" designates outputs to the banks 0, 1, 2 and 3 from left.

Outputs from the selector 208 and the selector 209 are exclusive to each other for respective bank. When an output of one of the selectors is data, an output from the other one of the selectors becomes 0. Therefore, the outputs from the selectors 208 and 209 are written to registers in the banks by calculating logical sums for respective banks.

The above-described explanation described the SIMD processor capable of designating a plurality of registers.

Next, an explanation will be given of SIMD operation instructions defined by utilizing the characteristic of the SIMD processor.

Generally, according to the SIMD processor, when data in registers are aligned in orders capable of immediately operating the data, maximum parallelism is achieved; however, in many cases, it is necessary to permute the data and thereafter execute a principal operation. Therefore, a reduction in a number of permutation cycles to as less as possible promotes the function of the SIMD processor.

A data pack instruction as shown by FIGS. 9 and 10 is defined by utilizing the characteristic of the invention.

FIG. 9 shows a case in which a shift amount is present in the register. FIG. 10 shows a case in which a shift amount is present in an instruction code as an immediate value.

FIG. 9 shows an operation code for reading a shift amount (Rn) of the data pack instruction from registers, subjecting data in a group of registers designated by notation Rm to a shift processing, and thereafter executing pack operation, and FIG. 10 shows an operation code in the case in which a shift amount (s) is an immediate value in contrast to FIG. 9.

As is known from an explanation of operation in FIG. 9, the instruction is used for packing four pieces of in-register data into a piece of data and storing the data.

Figure 11:
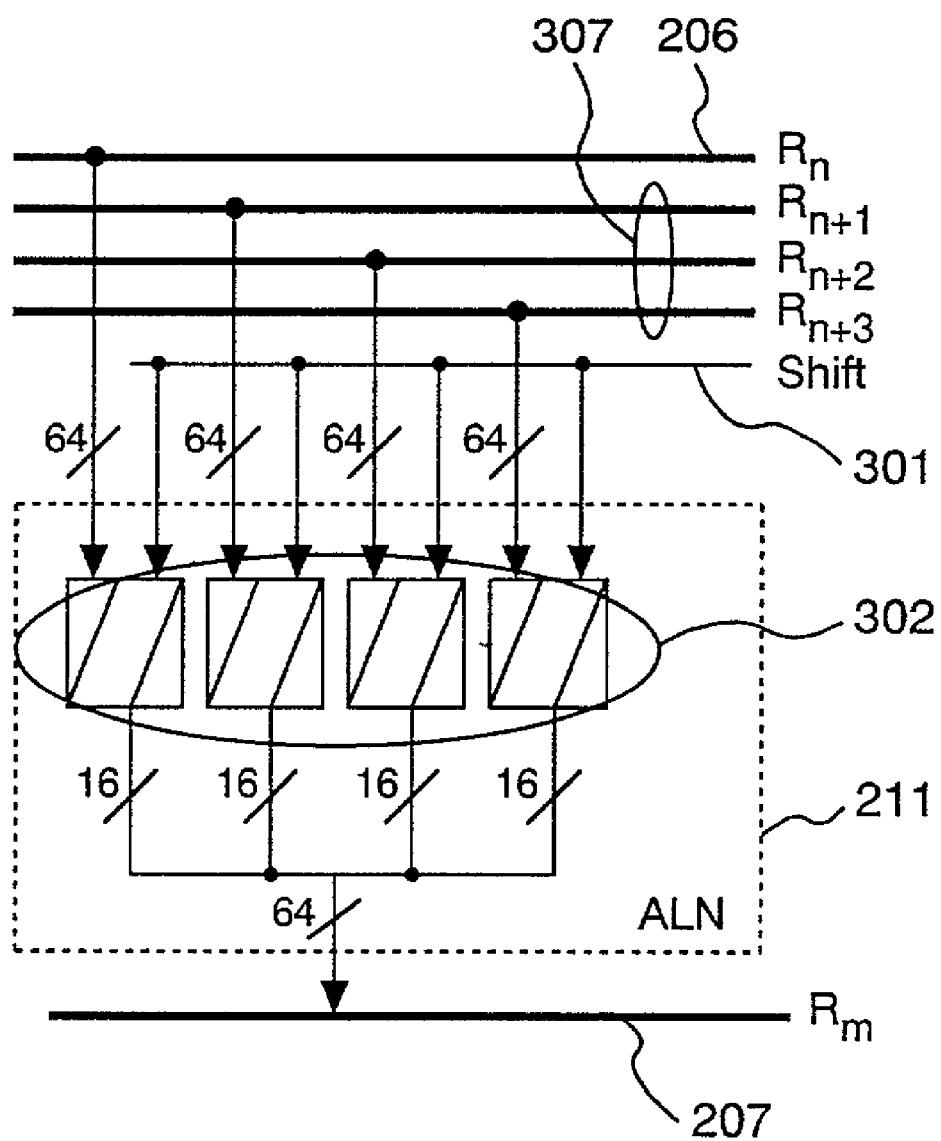
FIG. 11 is a functional constitution diagram for realizing a data pack instruction.

A circuit constitution for realizing the instruction is as shown by FIG. 11.

Four pieces of in-register data designated by a register designating field 1 (operand code m) are transmitted to the general purpose bus 206 and buses 307. Further, a shift amount indicated by a register designating field 2 (operand code n) is taken from a general purpose bus 301. The data and the shift amount are respectively inputted to a barrel shifter 302 for shifting with arbitrary bits. A division of a fixed-point is carried out by the barrel shifter 302.

It is possible that only lower 16 bits of the shifted results are respectively taken out, outputted to the general purpose bus 207, and packed to a single register as 64 bits width data.

Next, a data unpack instruction as shown by FIG. 12 and FIG. 13 is defined by utilizing the characteristic of the invention. The data unpack instruction is an instruction for dividing single in-register SIMD data into data of a plurality of registers and storing the data. The definition is carried out considering a case of dealing with 16 bit data in FIG. 12 and a case of dealing with 8 bit data in FIG. 13.

FIG. 12 shows an operation code for dividing data of 64 bits to that of respective 16 bits, subjecting divided data to sign extend of 64 bits, and writing the data to a write register. In FIG. 13, in contrast to FIG. 12, 8 bit data is dealt with, such that the number of write registers to be written is doubled.

A detailed explanation will be given of a circuit constitution for realizing the instruction in reference to FIG. 14.

In-register SIMD data designated by the register designating field 1 (operand code m) is transmitted via the general purpose bus 206.

Figure 14:
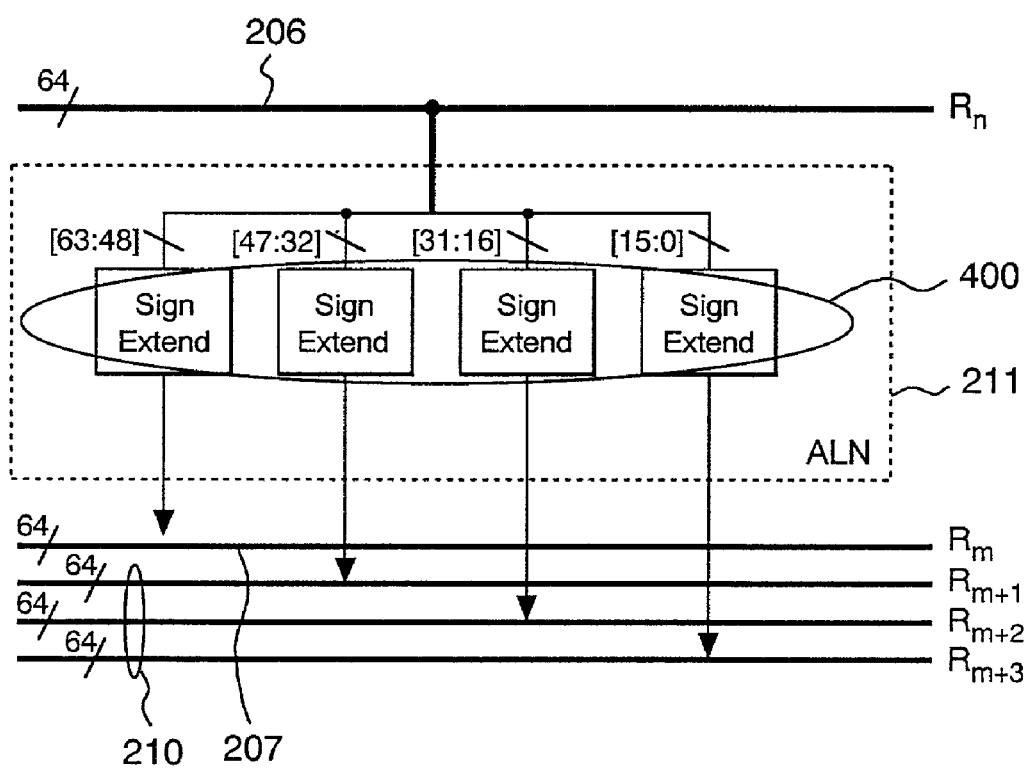
FIG. 14 is a constitution diagram for realizing a data unpack instruction.

FIG. 14, shows a case for dividing the in-register SIMD data into 16 bit data. Data transmitted via the general purpose bus 206 is divided into respective 16 bits, respectively inputted to separate sign extenders 400, subjected to sign extended into 64 bit data, and outputted to the buses 207 and 210. The data unpack function can be realized by the above-described operation.

Further, a permutation instruction as shown by FIG. 15 is defined by utilizing characteristic of the invention. In FIG. 15, there is shown an operation code for reading four pieces of designated in-register SIMD data, and storing the SIMD data subjected to designated permutation for respective elements and permuted to designated registers.

Generally, "permutation instruction" is effective in transposition or rotation of a matrix, butterfly operation of FFT (fast Fourier transform) or the like. A specific operation is shown in FIG. 16.

According to a conventional permutation instruction, when permutation operation is carried out with regard to, for example, two pieces of SIMD data of 16 bit×4 pieces, two pieces of 64 bit width registers for storing result are needed. However, only one piece of a destination register can be designated such that separate instructions are prepared for an upper bit portion and a lower bit portion of the permutation result.

According to the permutation instruction by designating a plurality of registers in one piece of register designating field, with regard to four pieces of source data as shown in FIG. 16, permutation operation of the upper bit portion and the lower bit portion is carried out at one time and two set portions are simultaneously operated.

Figure 17:
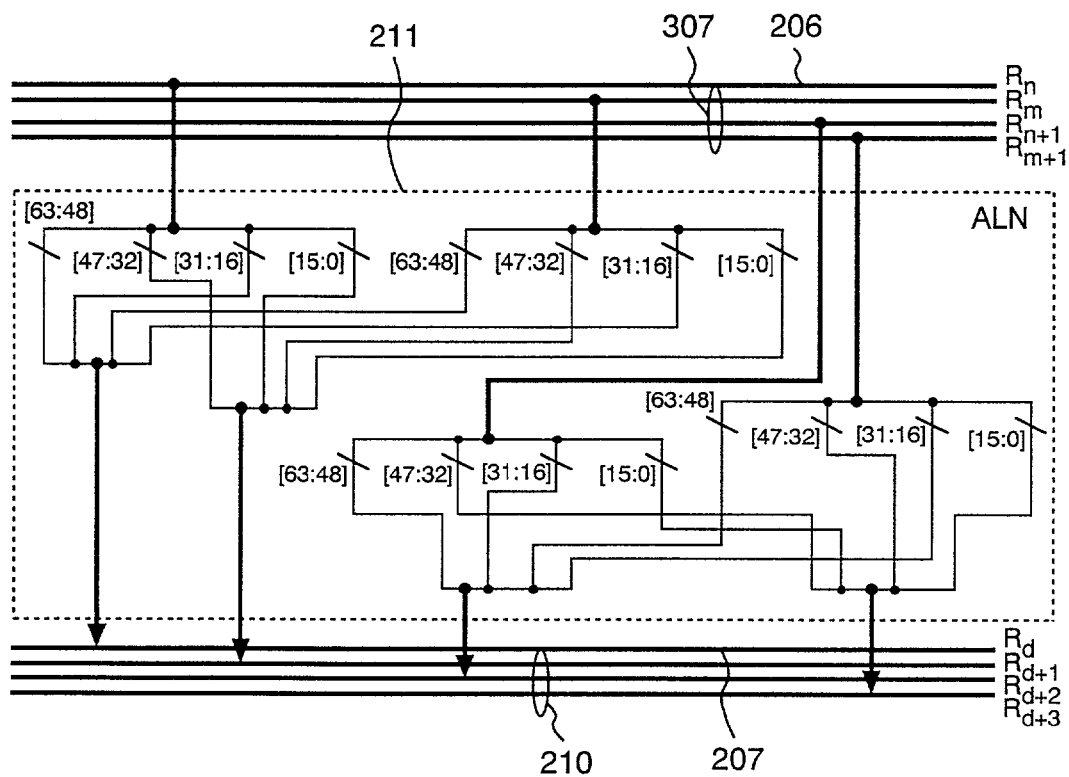
FIG. 17 is a functional constitution diagram for realizing a permutation instruction.

FIG. 17 shows a specific functional constitution diagram. Two pairs of pieces of source data transmitted via the general purpose bus 206 and the buses 307, are respectively divided into 16 bit widths and subjected to a permutation operation, and then the result is outputted to the buses 207 and 210 to be written to registers.

Further, in the case of complex number data, real numbers and imaginary numbers are frequently present alternately in loaded data. It is frequently necessary to constitute data rows of only real number data and only imaginary number data in operation.

In that case, according to the SIMD processor of the invention, 8 pieces of SIMD data can simultaneously be read at maximum and therefore, in the case of 16 bit data, a result of 16 data can be calculated at one time by executing permutation operation among 32 pieces of data.

In order to execute a processing of dealing with complex number data as described above, instructions as shown by FIG. 18 and FIG. 19 are defined.

FIG. 18 shows an operation code of a processing of reading 8 pieces of designated in-register SIMD data and, when respective elements are designated by numerals 1, 2, 3 and 4 by enumerating from a right end, extracting only data elements of 1 and 3, and storing the elements into designated registers. FIG. 19 shows an operation code of a processing of reading SIMD data, and then extracting only data elements of 2 and 4 and storing the data to designated registers.

Figure 20:
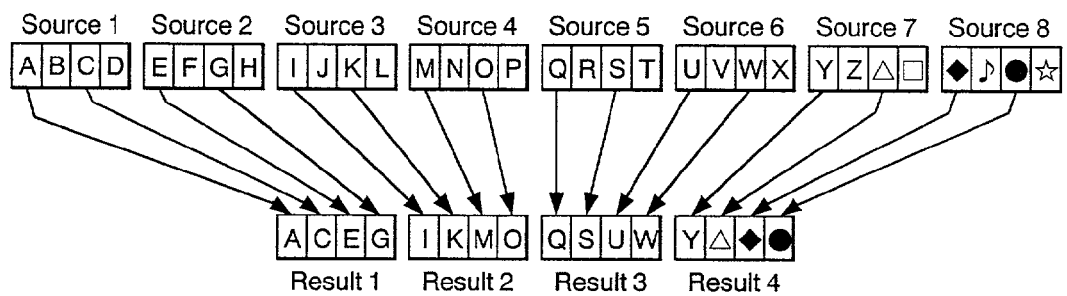
FIG. 20 is a diagram showing a specific example of using a permutation instruction.

Specifically, a processing as shown by FIG. 20 is executed, and data of 63 bit-th through 48 bit-th and data of 31 bit-th through 16 bit-th in respective in-register data are extracted.

Figure 21:
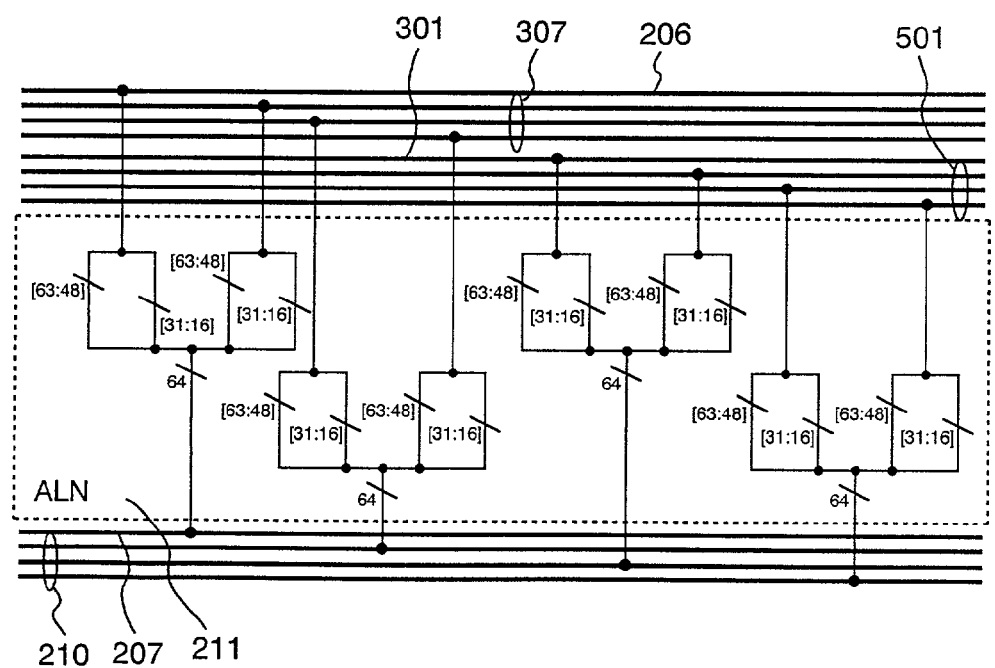
FIG. 21 is a functional constitution diagram for realizing FIG. 20.

An explanation is given to details of operation by a circuit constitution diagram of FIG. 21. 8 sets 32 pieces of SIMD data transmitted via the general purpose bus 206 and buses of 301, 307 and 501, are respectively extracted only for necessary 16 bit data, and results are outputted to the general purpose bus 207 and buses 210 to realize the operation.

Finally, multiply accumulate operation instruction as shown by FIG. 22 is defined by utilizing the characteristics of the present invention.

In FIG. 22, there is shown an operation code of a processing of reading two pieces of designated in-register SIMD source data, further reading in-register data constituting a basis of four pieces of accumulation, calculating the accumulation, and thereafter storing SIMD data to four designated registers.

In general multiplication, a result obtained for bit widths of a multiplier and a multiplicand is provided with a doubled bit width and therefore, according to SIMD type 64 bit data holding four pieces of data of 16 bit width, a register having 128 bit width is needed to store operation results. As a real solution, there is frequently adopted a method of storing data effective only in lower 32 bits of 64 bits width register and storing the result to 64 bits by sacrificing a parallelism of SIMD. However, when the accumulation is calculated, it is to further increase the bit width of the result. Even by the above-described method, operation accuracy is deteriorated.

In DSP (Digital Signal Processor), in the case of multiply accumulate operation of 16 bits×16 bits, accuracy of operation is devised to be maintained by preparing 40 bit registers for storing.

However, when utilizing the characteristic of the invention, multiply accumulate operation can be executed without deteriorating the parallelism of SIMD.

Figure 23:
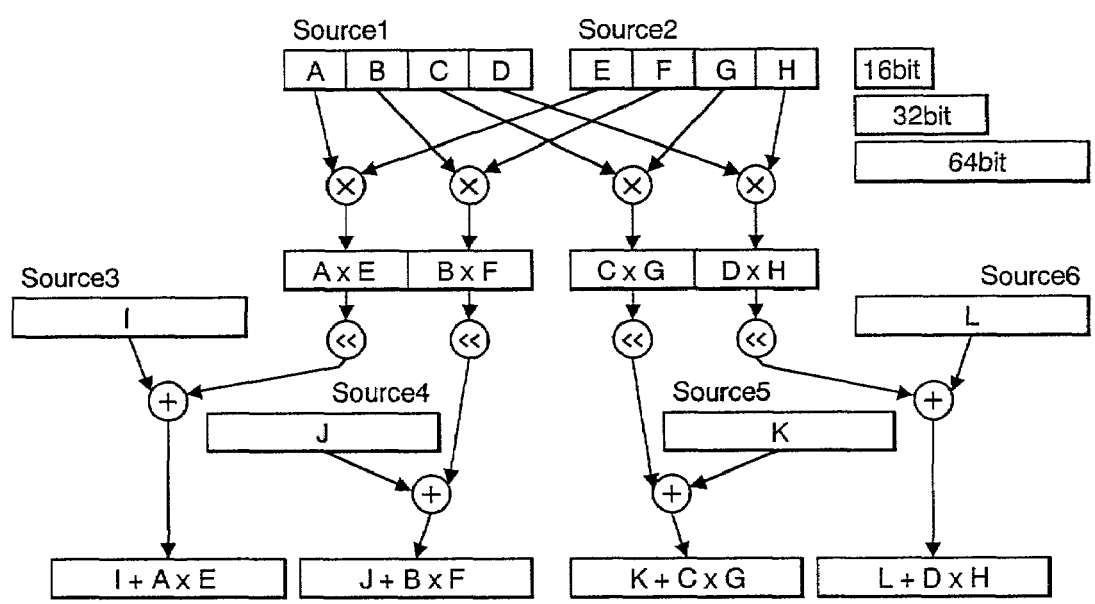
FIG. 23 is a specific explanatory diagram of a multiply accumulate instruction.
Figure 24:
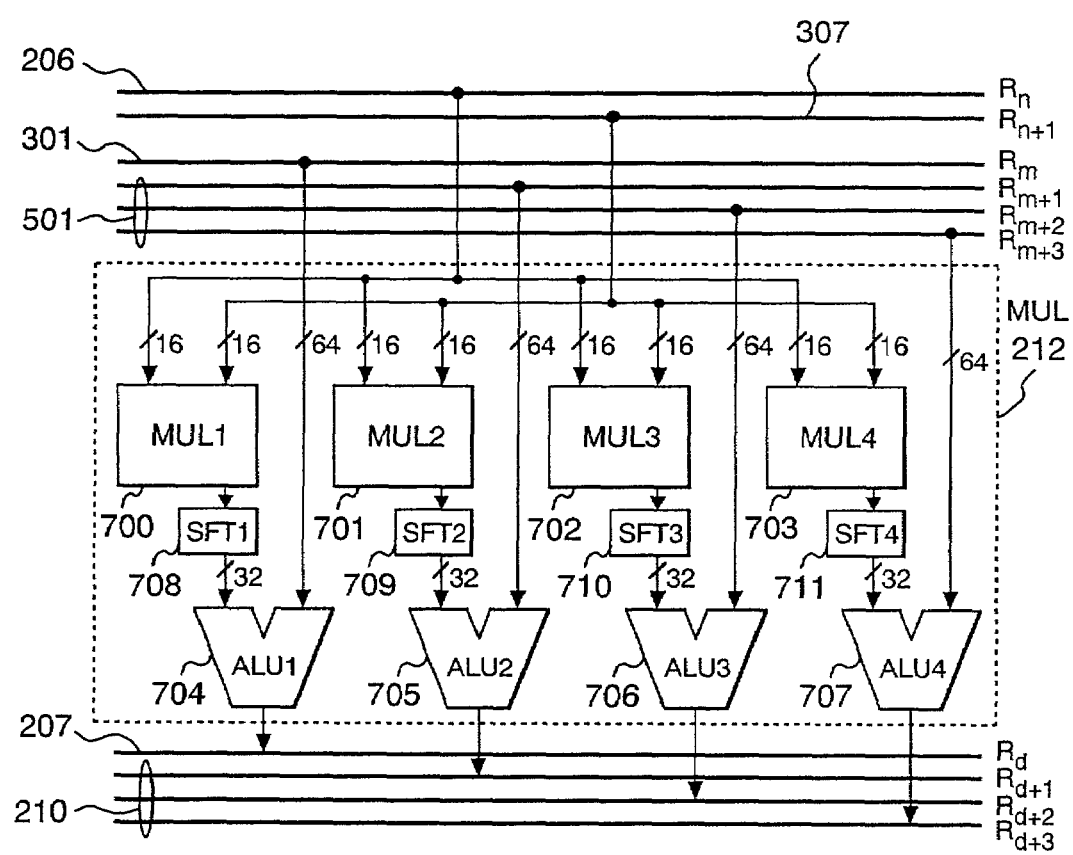
FIG. 24 is a functional constitution diagram for realizing FIG. 23.

FIG. 23 shows a specific explanatory view of a multiply accumulate instruction defined in FIG. 22, and FIG. 24 shows a circuit constitution diagram.

SIMD data including four pieces of 16 bit data is transmitted via the general purpose bus 206 and the buses 307. The SIMD data is divided into for each 16 bit data, respectively inputted to multipliers 700 through 703, and outputted to adders 704 through 707. Data of accumulation is transmitted via the general purpose bus 301 and buses 501 and is inputted to the adders 704 through 707. Results of the accumulation calculation are outputted to the general purpose bus 207 and the buses 210 for storing. By using such means, the multiply accumulate operation of SIMD data is realized without deteriorating accuracy, and the parallelism is maintained.

Although a specific explanation has been given of the invention based on the embodiments, the invention is not limited thereto but can be modified within a range not deviated from the gist.

For example, although the selector 204 in FIG. 1 is a selector of 3 outputs for 4 inputs, it is no problem to constitute the selector by using a tristate buffer.

In the case of the data pack instruction, in FIG. 11, the instruction is carried out by 4 inputs and one output, any number of inputs is acceptable, and the number of outputs is not restricted.

Further, in the case of the data unpack instruction, a number of division is determined by a type of SIMD data in registers and therefore, the number is not limited to four as in FIG. 14.

A simple explanation will be given of effects achieved by representative aspects of the invention as follows.

According to the SIMD processor of the invention, high speed formation of in-register data alignment operation, which may otherwise obstruct an effect of SIMD operation, is realized, and a multiply accumulate operation as in DSP can be realized.

Specific effects are enumerated as follows.

(1) By introducing the data pack instruction defined by the invention, scatteredly stored data is summarized and data can be processed efficiently by the SIMD instruction.

FIGS. 25A and 25B show an embodiment for packing four pieces of 16 bit data. FIG. 25A designates a program example of the case of the current state, and FIG. 25B designates the case of outputting a new data pack instruction.

Annotation "pack. W" in FIG. 25B designates a mnemonic of pack instruction. By adopting the data pack instruction as in the program example of FIGS. 25A and 25B, the number of instruction steps is reduced by ¼.

(2) By introducing the data unpack instruction defined by the invention, prompt initialization of registers and division of data are carried out, and even at a portion in which the SIMD processing is not effective, operation efficiency is not deteriorated.

FIGS. 26A and 26B show an embodiment for unpacking four pieces of 16 bit data present in one piece of register into four registers.

FIG. 26A designates a program example of data pack by using the conventional permutation instruction and FIG. 26B designates a program example adopting a new data unpack instruction. As is apparent also from FIG. 26B, by adding a new instruction, a number of instruction steps is reduced to ⅙.

(3) By introducing a permutation instruction defined by the invention, permutation of in-register SIMD data is executed at high speed, and data is supplied to SIMD processing such as a multiple accumulate operation, without delay.

FIGS. 27A and 27B show another embodiment. FIG. 27A designates a program example of using the conventional permutation instruction, and FIG. 27B designates a program example adopting a new permutation instruction. As is apparent from FIG. 27B, the number of instruction steps is reduced to ⅛.

What is claimed is:

1. A processor comprising:
a register file including a plurality of registers assigned with register numbers, each of the registers for storing at least one of operand data and operation result data;
a plurality of operation pipes, each operation pipe for executing in parallel one kind of operation on a plurality of the operand data so as to generate the operation result data;

a first decoder for decoding a first register designating field of an instruction code, said first register designating field having a first register designating number stored therewith, said first decoder further for generating signals designating source register numbers based on the first register designating number so as to be consecutive to each other;

a second decoder for decoding a second register designating field of the instruction code, said second register designating field having a second register designating number stored therewith, said second decoder further for generating signals designating result register numbers based on the second designating register number so as to be consecutive to each other; and a control circuit for sending the operand data stored in source registers corresponding to the designated source register numbers to at least one of the operation pipes such that said at least one of the operation pipes executes in parallel the one kind of operation associated therewith on the operand data and for sending the operation result data obtained from the at least one operation pipe to result registers corresponding to the designated result register numbers, wherein the plurality of registers are divided into a plurality of banks, and by reading or writing data from the plurality of banks, the number of ports of reading or writing the data of respective banks is restricted to be equal to or smaller than a number of the register designating fields so as to restrain an increase in a circuit scale caused by reading or writing the data by a number of times larger than the number of the register designating fields contained in the instruction code.

2. The processor according to claim 1, wherein a data pack operation, which deals with a number of the data read from the source registers larger than a number of the data written to the result registers, data read from the source registers are larger in a number than a number of the register designating fields contained in the instruction code so as to eliminate invalid portions in the result registers.

3. The processor according to claim 1, wherein a data unpack operation, which deals with a number of the data written to the result registers larger than a number of the data read from the source registers, a number of data written in parallel to the result registers is larger than a number of the register designating fields contained in the instruction code so as to avoid data writing a plurality of times.

4. The processor according to claim 1, wherein an operation of outputting the data having a data width wider than a width of input data such that a number of data larger than a number of the write register designating fields contained in the instruction code can be written to the results registers so as to eliminate invalid portions in the input data and avoid mounting a special register having a wider data width.

* * * * *